United States Patent [19]

Cornelius et al.

[11] Patent Number: 5,247,303
[45] Date of Patent: Sep. 21, 1993

[54] DATA QUALITY AND AMBIGUITY RESOLUTION IN A DOPPLER RADAR SYSTEM

[75] Inventors: Richard H. Cornelius, Boulder; Richard W. Gagnon, Jamestown; Jules F. Pratte, Longmont, all of Colo.

[73] Assignee: University Corporation for Atmospheric Research, Boulder, Colo.

[21] Appl. No.: 916,941

[22] Filed: Jul. 20, 1992

[51] Int. Cl.$^5$ .............................................. G01S 13/95
[52] U.S. Cl. ....................................... 342/26; 342/84; 342/460
[58] Field of Search ...................... 342/26, 82, 83, 88, 342/84, 460

[56] References Cited

U.S. PATENT DOCUMENTS

| 3,603,999 | 9/1971 | Palleiko | 342/189 |
| 3,808,594 | 4/1974 | Cook et al. | 342/201 |
| 3,883,871 | 5/1975 | Moore | 342/201 |
| 3,889,261 | 6/1975 | Sirven | 342/127 |
| 3,987,443 | 10/1976 | Cross | 342/192 |
| 4,600,925 | 7/1986 | Alitz et al. | 342/26 |
| 4,626,855 | 12/1986 | Rouse | 342/201 |
| 5,093,662 | 3/1992 | Weber | 342/26 |

Primary Examiner—John B. Sotomayor
Attorney, Agent, or Firm—Duft, Graziano & Forest

[57] ABSTRACT

The pulsed Doppler weather radar system reduces ambiguities in measured parameters by staggering at least one pulse of each frame of n pulses transmitted by the radar system. The staggered pulse creates an isolated pulse doublet pair to provide three or more independent and auxiliary Doppler parameter estimates. The parameter estimates are combined optimally in a neuromorphic processor matched to the phenomena of interest, particularly capitalizing on multiparameter volumetric correlations to improve data quality.

40 Claims, 5 Drawing Sheets

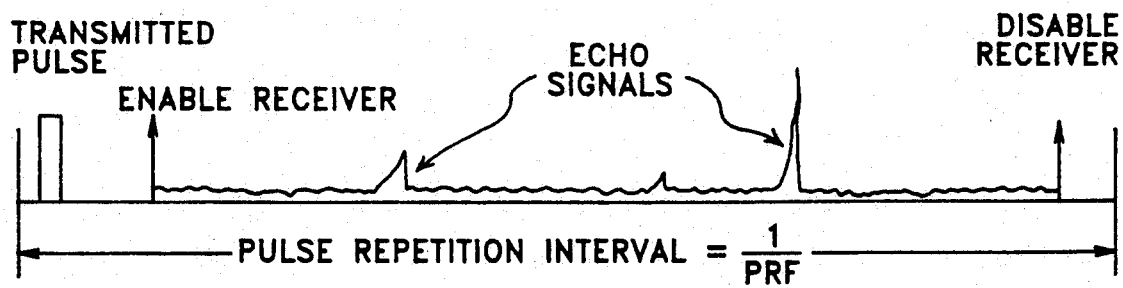
FIG.2
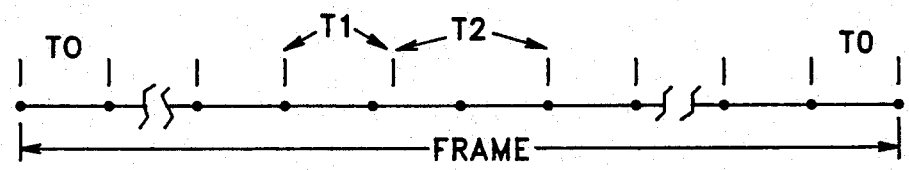
FIG.5
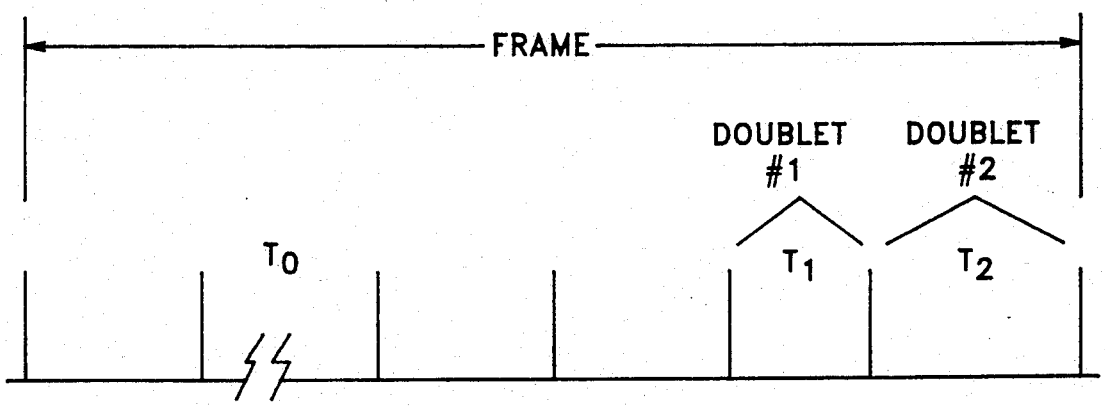
FIG.4
| HEADER | $Z_0$ $V_0$ $W_0$ $SNR_0$ | $Z_1$ $V_1$ $W_1$ $SNR_1$ | $Z_2$ $V_2$ $W_2$ $SNR_2$ |
FIG.7

DATA QUALITY AND AMBIGUITY RESOLUTION IN A DOPPLER RADAR SYSTEM

GOVERNMENT FUNDED INVENTION

This invention was made with Government support under Agreement No. ATM-8709659 awarded by the National Science Foundation. The Government has certain rights in this invention.

FIELD OF THE INVENTION

This invention relates to pulsed Doppler radar systems and in particular to a system that has an improved method and apparatus for determining parameters relating to detected objects.

PROBLEM

It is a problem in the field of Doppler radar systems to resolve ambiguities in the received signals. In a pulsed Doppler weather radar system, one of the most serious causes of data quality degradation is range aliased echoes from distant storms. This range contamination can occur in the immediate vicinity of a meteorological event and this contamination can be significant enough to obscure the meteorological event. Alternatively, range alias contaminated data can present a radar signature similar to that of a wind shear hazard, thereby generating false alarms in wind shear detection systems. Velocity aliasing also occurs when the radar system cannot distinguish between actual Doppler shifts and aliases that are spaced in frequency by the pulse repetition frequency.

Range and velocity ambiguities are inherent in Doppler radar systems. Doppler radars are typically operated with a uniform pulse repetition frequency and when targets have a range that is great enough, the echoes (return signals) of the $n^{th}$ transmitted pulse are received after the $(n+1)^{st}$ pulse is transmitted and in subsequent range intervals $(n+2, n+3)$. Therefore, echoes from distant targets are received during the same time interval that echoes are received from close-in targets, thereby creating an ambiguity with respect to the location of the target.

One potential solution to the parameter ambiguity problem is to provide a series of transmitted pulses that vary in pulse position Staggered pulses can be used for this purpose, wherein two streams of constant pulse repetition frequency pulses are merged to produce alternating pulses of differing frequencies. This produces two sets of return echo signals, each at a different distinguishable frequency to thereby reduce the parameter ambiguities in the received echo signals. A difficulty with such an arrangement is that the complexity of the computations required to process the received echo signals is significantly increased, even though a significant improvement is made in the elimination of ambiguity. The complexity and cost of the entire system: antenna, transmitter, receiver, processors, can rapidly increase. This is especially true in the field of meteorological radars since these improvements add significant system complexity but do not adequately address the requirements that are unique to Doppler weather radar systems: recover weather target data within a range of approximately one hundred kilometers in the presence of weather targets beyond that range and in the presence of clutter, maintain maximum sensitivity for a wide dynamic range of targets, maintain significant and uniform clutter discrimination. Furthermore, a limited range of pulse repetition frequencies can be used within Doppler weather radar systems since low pulse repetition frequency systems have no range ambiguities but have velocity ambiguities while high pulse repetition frequency systems have no velocity ambiguities but have range ambiguities and echo signal coherency must be maintained. A low pulse repetition frequency is sometimes used to unambiguously locate long range echoes in a split-scan mode or, alternatively, a mixed low/high pulse repetition frequency called a batch/interlaced mode, can be used. Doppler weather radar systems typically select pulse repetition frequencies in a mid-range of approximately eight hundred to fifteen hundred hertz for primary measurements, wherein both velocity and range ambiguities exist but adequate data is available in the received echo signals to obtain fairly accurate readings of the desired parameters. Nearly all pulsed Doppler weather radar systems accomplish ranging through the pulse delay technique without modulation of the output pulses.

Therefore, there presently does not exist any Doppler radar system that can completely satisfy the unique requirements of weather sensing to obtain parameter data that is accurate to a high degree of precision without requiring excessive system cost and complexity in antennas, transmitters and waveform processing. The range velocity ambiguity problem in weather radars that depend on the basic uniformly-spaced transmit pulses become more troublesome in large-scale precipitation and at shorter wavelengths. Also, the theory of fluid dynamical systems has demonstrated the existence of nonlinear, dissipative and statistically non-homogeneous phenomena whose behavior is chaotic rather than noisy. A chaotic fluid dynamical system like the atmosphere and atmospheric phenomena appear quite irregular and exhibit motion and properties across wide frequency spectra. The fundamental ease at which trained meteorologists can sift atmospheric patterns in Doppler weather radar data from noise, clutter, range folded contamination and velocity ambiguities, is sometimes remarkable. An efficient processing scheme which admits chaotic origin in the sequences of fields of data is inherently more robust against noise.

SOLUTION

The above-described problems are solved and a technical advance achieved in the field by the pulsed Doppler radar system of the present invention which makes use of a unique transmit waveform that reduces parameter ambiguities in the received echo signals without a significant impact in signal processing requirements or system complexity. This is accomplished by modifying the transmitted constant pulse repetition frequency pulse train by staggering at least one pulse per frame. By time shifting one pulse per frame in the transmitted constant pulse repetition frequency sequence, an isolated pulse doublet pair is created to thereby provide at least three independent Doppler parameter estimates for the object that is detected by the radar. The selection of the number of pulses per frame as well as the number of pulses shifted per frame are a function of specific system requirements as well as the objects to be detected by the system. The addition of a matched parallel processor produces a further improvement in the quality of the output data.

The nature of weather targets is that they exhibit a significant degree of spatial and temporal continuity across many contiguous radar resolution cells. Therefore, the use of the periodic isolated pulse doublet pairs in the transmitted series of pulses yield additional estimates of Doppler velocity and range placement that are of sufficient accuracy to eliminate the ambiguity inherent in the use of a constant pulse repetition frequency signal. To maintain clutter rejection performance, the constant pulse repetition frequency sequence is regenerated from the received echo signals. This is accomplished by extracting the staggered pulse return echo signal from the received stream of return echo signals and calculating a received echo signal for the missing pulse using a mathematical algorithm to, for example, extrapolate a received echo signal for the missing pulse from the previously received echo signals from the previously transmitted pulses. Therefore, a frame of uniformly spaced return echo signal samples from the transmitted constant pulse repetition frequency pulses can be recreated from the received echo signals to obtain a constant pulse repetition frequency estimate of range and velocity with little degradation. In addition, this waveform does not preclude or complicate the application of frequency or phase coded pulses or multiple polarization sensing.

The received echo signals from the isolated pulse doublet pairs that are created at least once per frame require less signal processing power than the high rate pulses since they occur infrequently. The reliability of the estimates of Doppler range and velocity calculated from the return echo signals from the pulse doublet pair can be improved by averaging the calculated parameters over a plurality of frames. Coherent averaging is not normally possible due to the low signal rate of these isolated pulse doublet pairs. However, since the spatial and temporal variation of meteorological events tend to be low, the return echo signals from the transmitted pulse doublet pairs can be processed pairwise and then averaged over both range and azimuth to provide non-coherent space and time averaging. This non-coherent averaging yields a sufficient number of samples to reduce the variance of the parameter estimates from the pulse doublet pair return echo signals to match the variance of parameter estimates from the constant pulse repetition frequency return echo signals.

This waveform methodology thereby yields at least three high quality parameter estimates that can be used within the pulsed Doppler radar system to precisely identify meteorological events with a much higher degree of accuracy than found in existing pulsed Doppler radar systems. In addition, the expanded range of parameter measurements possible with this system provide the user with greater latitude in selecting the pulse repetition frequency to minimize overlaid weather echoes. The three sets of parameter estimates that are created by this Doppler radar system can be used with a neuromorphic system to more precisely identify the nature, presence and locus of targets, such as meteorological events, that occur within the range of operation of this Doppler radar system. A neuromorphic system is a processor that imitates some form and function of the human brain and would include fuzzy logic, inference systems, knowledge-based systems, artificial neural systems, parallel distributed processors, etc. The use of a neuromorphic system is beneficial, since the distinguishing criteria of many meteorological events are not amenable to standard linear processing approaches and are multi-variable, being a function of target geometry, reflectivity, velocity, echo spectrum width, etc. Therefore, a neuromorphic processor, making use of "expert" knowledge of the meteorological phenomena to be detected, can make use of the three or more parameter streams produced by this unique signal format to counteract the ambiguity problems of existing Doppler radar systems. In addition, a neuromorphic system can selectively enable the isolated pulse doublet pair capability as a function of the detected presence of weather events, scan sector, time of day or other deterministic factors. The selective enablement can modify the radar system modulation waveform, its scanning pattern and processing to match the meteorological events (spatial distribution, intensity, geometry) to be detected. In addition, these characteristics can be modified to match the wavelength of the radar signal, echo signal characteristics, transmitter constraints (duty ratio, peak power, pulse repetition frequency limits) as well as the application of inter- and intra-pulse modulation, including compression coding and chirp.

BRIEF DESCRIPTION OF THE DRAWING

FIG. 2 illustrates waveforms usually used in the operation of a typical prior art Doppler radar system:

FIGS. 4 and 5 illustrate an example of transmitted pulse signal waveforms of the Doppler radar system of the present invention:

FIG. 7 illustrates an example of a data format used in this apparatus; and

DETAILED DESCRIPTION

Radar systems perform two primary functions: surveillance and tracking; and two secondary functions: target recognition and target measurement. For example, airport weather radar systems are of the surveillance-type and function to search a volume of space around an airport to detect the presence and identify the locus of meteorological events that can affect flight operations at the airport. Modern weather radar systems are pulsed Doppler radar systems that transmit a stream of fixed duration pulses of radio frequency energy at repeated intervals, called the pulse repetition interval (PRI). The transmitted pulses are reflected by a target and the received return echo signals are used to measure the range of the target while the angle of the target is obtained from the antenna readout. In addition, weather radar systems extract Doppler information from the received train of return echo signals to discriminate between moving targets and radar clutter.

Figure 1:
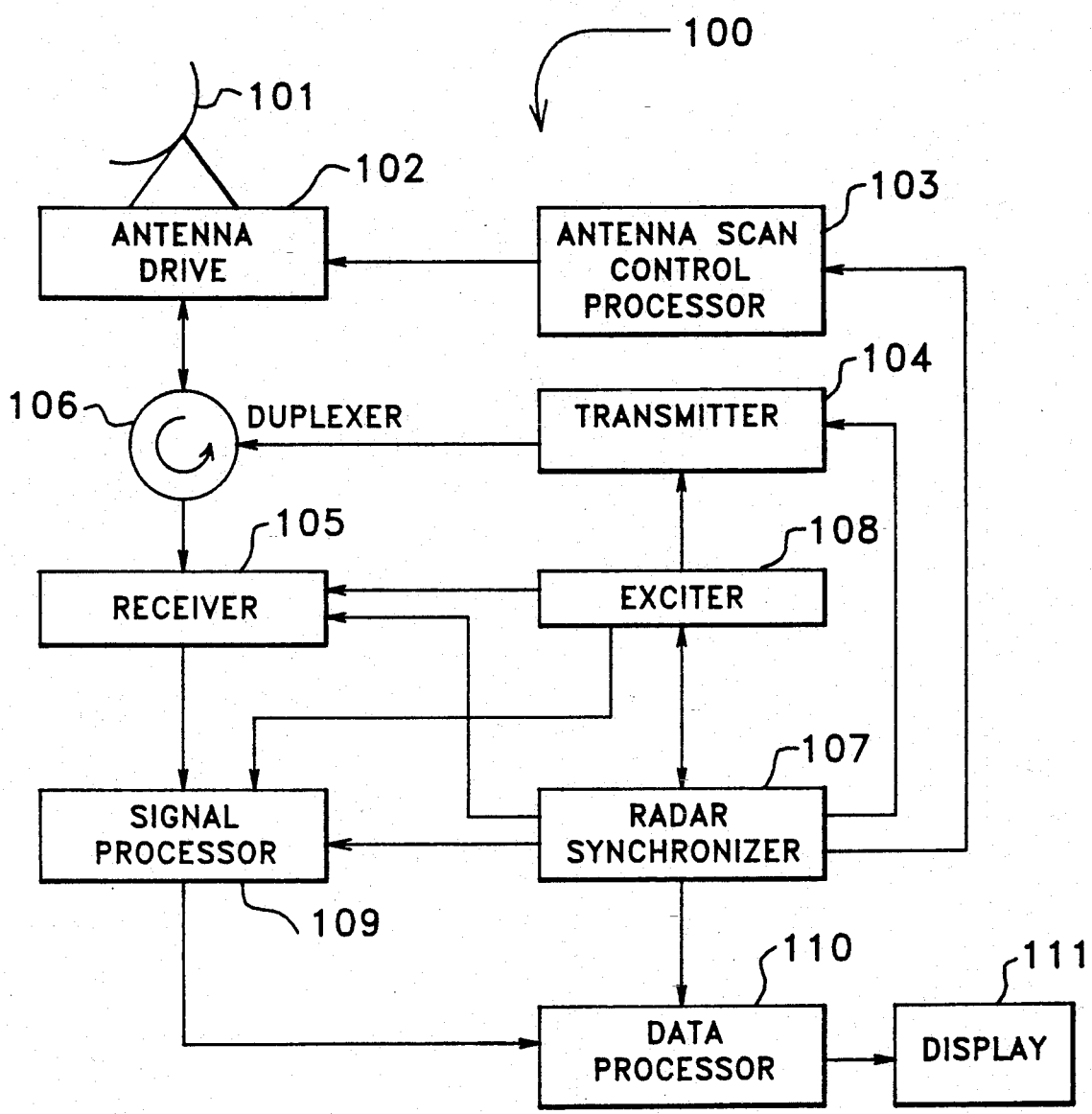
FIG. 1 illustrates in block diagram form the overall architecture of a typical prior art Doppler radar system.

FIG. 1 illustrates a functional block diagram of a prior art pulse Doppler weather radar system 100 used to detect meteorological events. The functional elements illustrated in FIG. 1 are well-known and are not disclosed in detail for simplicity and brevity of description. These elements are used to illustrate the underlying concepts of pulsed Doppler radar and may not exactly correspond to the physical entities found in a specific system. This pulsed Doppler radar system 100 consists of a directional antenna 101, such as a center feed circular parabolic reflector. The directional antenna 101 is mounted on a pedestal and can be moved through azimuth and elevation motions by drive motors 102 to scan a predetermined volume of space around the radar site. An antenna scan control processor 103 is used to regulate the servo systems that function to drive the azimuth and elevation drive motors 102 or to electronically steer the active antenna elements to guide the antenna beam through a scan pattern. A transmitter 104 and a receiver 105 are also included to couple signals through a duplexer 106 to the directional antenna 101 as is described in further detail below. A radar synchronizer 107 is used to control the operation of the various components of the Doppler radar system 100 and to provide the requisite synchronization therebetween. In particular, the radar synchronizer 107 transmits timing signals to the antenna scan control processor 103, transmitter 104 and receiver 105 as well as to an exciter 108, which generates the control signal waveforms used by the transmitter 104 and receiver 105 to produce a sequence of pulses of electromagnetic energy which constitute the pulsed Doppler radar signals.

The output of the exciter 108 consists of a series of output pulses which are applied to the transmitter 104. The transmitter 104 consists of an amplifier that increases the amplitude of the output pulses produced by exciter 108 to the desired level. The radio frequency signal is typically amplified by a high power amplifier, the output of which is fed to the directional antenna 101 through the duplexer 106. The directional antenna 101 provides an impedance match between the guided wave output of the radar transmitter 104 and the free space propagation of the radar pulse. The antenna characteristics determine the two-dimensional beam shape and beam width of the transmitted radar energy. The directional antenna 101 concentrates the transmitted energy into a particular solid angle, thereby amplifying the total radar energy in a particular direction as opposed to transmitting the radar energy equally in all directions. The pulse of radio frequency energy output by the directional antenna 101 travels through space until it hits a target, which acts as a reflector. The target intercepts a portion of the transmitted radar power and re-radiates it in various directions. A component of the re-radiated or reflected radar energy is detected by the directional antenna 101 and applied through the duplexer 106 to the receiver 105. The radar target, in reflecting the radar pulse, modifies the frequency of the transmitted radar waveform. A component of the target velocity along the propagation direction of the radar transmission ($V_R$) shifts the frequency of the transmitted pulse, due to the Doppler effect, according to the relation $$\Delta f = \frac{-2V_R}{\lambda}$$

where $\Delta f$ is the magnitude of the frequency shift and $\lambda$ is the wavelength of the transmitted pulse.

Weather surveillance radars continually scan a volume of space. The antenna beamwidth, antenna scan rate and pulse repetition frequency of such a radar determine the number of pulses transmitted per unit of time and hence the number of return echo signals received by the radar. A typical surveillance radar transmits a plurality of pulses during the time it takes the antenna beam to sweep across a target. Therefore, it is obvious that there is a need for synchronization between the transmitter 104 and receiver 105 in order to accurately determine the correspondence between a transmitted pulse and its received reflected component to thereby determine the range of the target from the radar.

The reflected radar energy captured by the directional antenna 101 is sent to the radar receiver 105 via duplexer 106 which converts the frequency of the received energy (echo) from the radio frequency to an intermediate frequency. The receiver 104 amplifies the received echo signal and maximizes the signal to noise ratio of individual pulses. The resultant pulse information is sent to the signal processor 109, which interprets the content of the received echo signal. The signal processor 109 includes filters to minimize unwanted returns from clutter such as energy reflected by obstacles, topological features in the vicinity of the radar or other sources of unwanted noise. This signal processor 109 then presents its output to the data processor 110 which generates the customer useable output in the form of quality controlled data sets, a visual display, and/or alphanumeric displays to indicate the presence, locus and nature of targets detected in the radar beam scan pattern.

Radar Detection of Targets

Target detection is performed in the radar receiver 105, signal processor 109, and data processor 110 subsystems. The radar receiver 105 must differentiate the reflected radar signal from the system noise background. The received signal strength depends on the target range and reflection characteristics of the target as well as the radar transmit power and antenna gain. As can be seen from FIG. 2, the radar system commonly transmits pulses of electromagnetic energy at a fixed rate called the pulse repetition frequency (PRF). The time interval between two successive pulses is called the pulse repetition interval (PRI). The pulse repetition interval is the reciprocal of the pulse repetition frequency. In operation, the radar synchronizer 108 and the exciter 107 operate to activate the transmitter 104 to produce a transmitted pulse of radio frequency energy at a predetermined time in the pulse repetition interval. A short time later, the synchronizer 107 enables the receiver's 105 signal reception to detect returning echo signals that represent reflected radar pulses from the present or a previously occurring pulse repetition interval. The receiver's signal reception is enabled for a predetermined duration during this pulse repetition interval in order to detect pulses of radio frequency energy reflected from a target within the scan of the antenna beam. The received echo signal represents the return echo from a transmitted pulse that occurred a certain number (p) of pulse repetition intervals prior to the presently occurring pulse repetition interval.

In pulse Doppler weather radar systems 100, the most serious causes of data quality degradation is due to range aliased echoes from distant storms and clutter of non-meteorological origin. Range alias contamination can occur in the immediate vicinity of a meteorological event and can obscure the meteorological event. In other instances, range contaminated data can present a radar signature similar to that of a wind shear hazard, causing the Doppler weather radar system 100 to generate a false alarm. In addition, velocity ambiguities can degrade operations since the wide span covered by weather velocities and ranges places serious constraints on the pulsing/scanning capabilities of conventional Doppler weather radar systems. The maximum unambiguous range $R_a$ of a Doppler radar for a given pulse repetition interval PRI is $R_a = c\,PRI/2$ while the maximum unambiguous Doppler velocity $V_a$ for a given wavelength $\lambda$ is $V_a = \lambda/4PRI$. In order for a weather radar system to achieve a high probability of detecting and classifying meteorological hazards while maintaining a low probability of false alarms, an effective means of dealing with range and velocity and clutter contamination are required.

Prior Art Ambiguity Elimination

There are many methods proposed for eliminating ambiguities in the return signals of Doppler radar systems. Range and velocity ambiguities are inherent in typical Doppler radar with uniform pulse repetition times, since targets having a large range can return an echo for the $n^{th}$ transmitted pulse after the transmission of the $n+1^{st}$ transmitted pulse and in subsequent pulse repetition intervals ($n+2$, $n+3$, etc.). Thus, strong meteorological events that are located a significant distance from a radar site can produce return echoes that overlay return pulses from meteorological events that are located close to the radar site. Furthermore, target velocity ambiguities can be present since the target's phase is sampled at periodic intervals and, with multiple return pulses, a given set of sampled phases can not be accurately related to a single unique Doppler frequency. Therefore, target radial speeds must lie within a narrow unambiguous velocity limit to avoid ambiguity.

In selecting the pulse repetition frequency for a Doppler weather radar system, a low pulse repetition frequency produces no range ambiguities but does have velocity ambiguities, while a high pulse repetition frequency system has no velocity ambiguities but does have range ambiguities, while a medium pulse rate frequency system has both types of ambiguity inherent therein. In principle, one can choose the pulse repetition time large enough so that no second or higher order trip echoes are even received, but increasing the pulse repetition time is limited in that return echo samples must be correlated for accurate Doppler measurements. Increasing the pulse repetition time causes an exponential decrease in the correlation between successive samples, thereby causing the variance in mean Doppler frequency estimates and Doppler width estimates to increase exponentially. Therefore, the selection of pulse repetition frequency is a zero sum problem, where benefits obtained in one area result in losses in another area, such as signal quality and data ambiguity. Therefore, very limited flexibility is available in the use of constant pulse repetition frequency based systems to obtain improvements in the data output of the pulsed Doppler weather radar system 100 since unambiguous range and velocity are tightly coupled with $R_a V_a = c\lambda/8$.

The constant pulse repetition frequency signal yields the most convenient processing, and notch filter rejection is typically used to eliminate the predominant source of clutter (fixed surface-based objects and terrain) to recover additional (intra-clutter visibility) airborne targets (air motion tracers) with fairly good estimation accuracy. Alternatively, the waveform itself can be modified to improve the ambiguity resolution in pulse Doppler weather radar systems. One scheme is based on staggered spacing of transmitted pulses wherein the autocovariance and velocity estimates from two pulse repetition periods are suitably summed to effectively increase the composite unambiguous velocity. In this arrangement, two pulse trains are concurrently generated and transmitted by the transmitter 104. The pulse trains are time shifted so that successive pulses are separated by first and second time spacings. This causes two sets of return signals to be produced, each of which produces different unambiguous intervals with significantly different velocity aliasing. The differences between these two sets of results can be used to resolve the true velocity of the phenomena. The mean velocity aliases can only be resolved so long as the expected difference between the measured velocities remains unambiguous.

An alternative method of reducing ambiguity is the use of frequency diversity by producing two sets of signals with non-overlapping spectra. These two sets of signals are uncorrelated and such signals, when transmitted, generate on return uncorrelated and thus independent return echo signals. A simple way of creating uncorrelated signals is to offset the frequencies in successive transmitted pulses by more than the reciprocal of the pulse width. A train of M such pulses, each with a different frequency, produces M virtually independent return echo signals which, after averaging give improved reflectivity estimates for the same dwell time. Velocity estimates must be obtained from pairs or sequences of pulses that are transmitted at the same carrier frequency. Autocovariance type processing must be used to retrieve the mean velocity or spectrum width because Fourier analysis is not suitable. A disadvantage of the scheme is that for all practical purposes it severely complicates ground clutter canceling. In addition, the measurement of velocities in the second trip echoes involves a more complicated receiver because in processing the coherent returns from targets in the first trip echo, one must also process the returns from targets in the second trip echoes at the second frequency. This necessitates two or more receiving channels following the mixer and the use of complex filters.

Other methodologies used to reduce ambiguity in the received signals are to vary (chirp) the frequency or to introduce pseudo-random phase shifts between transmitted pulses. These schemes likewise produce additional data that can be used to resolve range and velocity ambiguities in the return echo signal but, like the prior methods discussed above, require significantly more complex receivers and data processing in order to obtain the data from the return echo signals. Therefore, present Doppler weather radar systems rely on the use of a constant pulse repetition frequency signal since this produces data output of sufficiently high quality that the cost penalty of significantly increased complexity in the apparatus is not warranted for the type of improvement in return signal quality.

Doppler Weather Radar Selection Criteria

Figure 3:
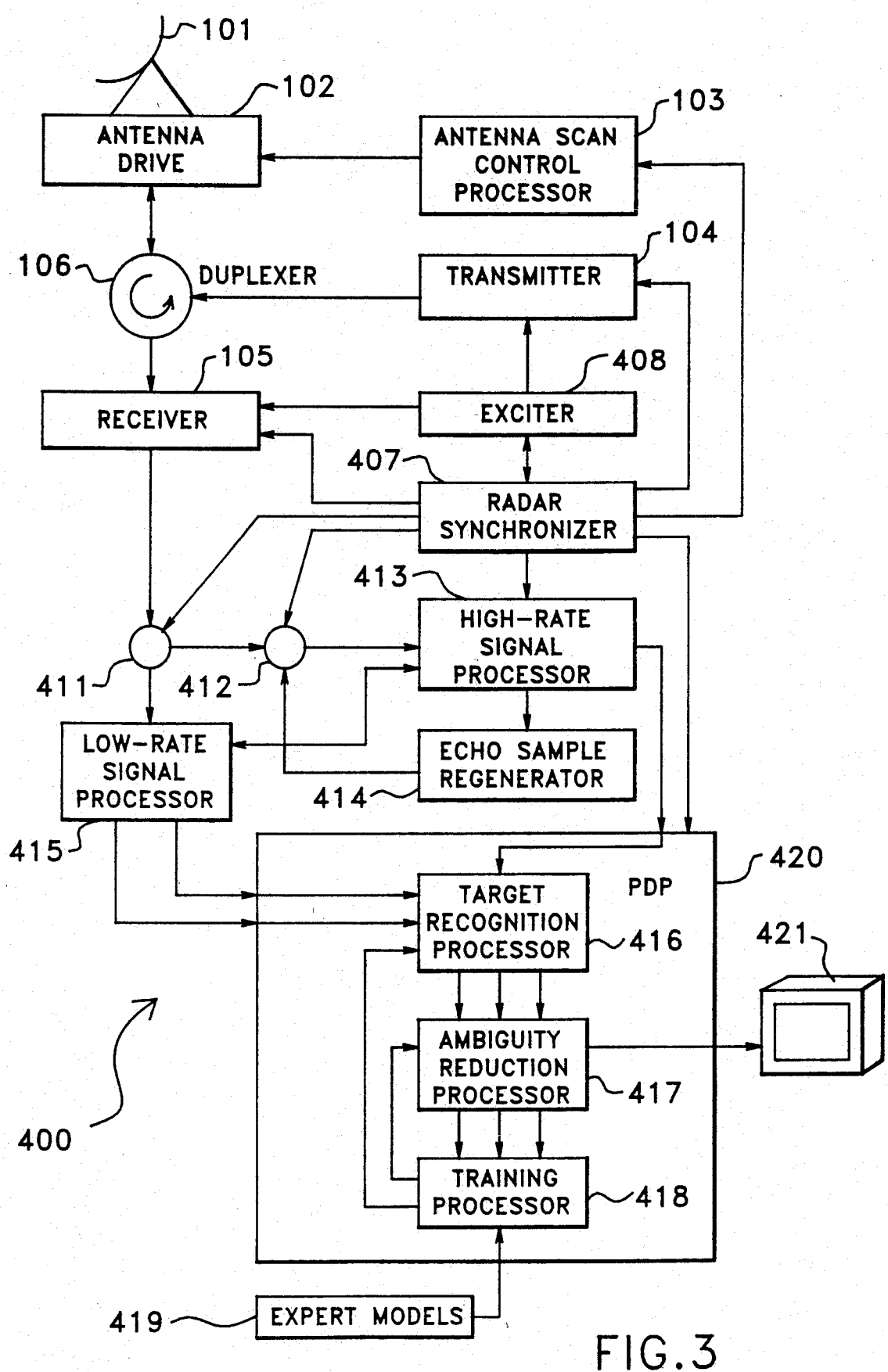
FIG. 3 illustrates in block diagram form the overall architecture of the Doppler radar system of the present invention.

FIGS. 4 and 5 illustrate the waveforms of a compound transmit signal and FIG. 3 illustrates a functional block diagram of the apparatus 400 used to generate, receive and process this compound transmit signal for the improved pulse frequency Doppler radar of the present invention. Given the limitation that the data produced by a Doppler radar system must be generated in real time with a high degree of accuracy and spanning a significant range of area coverage, the computations required of this Doppler radar system 400 must be well within the range of present processing technology and therefore must not significantly depart from the existing constant pulse repetition frequency architecture of existing Doppler weather radar systems 100 such as that shown in FIG. 1. In particular, efficient filtering can only process regularly spaced pulses and the use of multiple frequency signals require the use of multiple notch filters which can aggravate data recovery problems from the return echo signal in its attempt to eliminate ambiguities.

In a typical Doppler weather radar installation, the operational range of the radar is determined by the geometry the Doppler weather radar installation. Given the postulate that a constant medium to low pulse repetition frequency pulse train is best for detecting meteorological phenomena, the base pulse repetition frequency is selected from considerations of signal coherence at the operating frequency and from the spatial distribution of the weather. For many installations, the pulse repetition frequency is in the range of 500 to 800 HZ, yielding clearing ranges of about 200 to 300 kilometers. Because of the spatial distribution of meteorological phenomena and the sensitivity of these radar systems, these clearing ranges contain virtually all the weather detectable in a single return echo, leaving a small probability of regions of multi-trip overlaid echo to be separated in processing. However, the constant, low to medium pulse repetition frequency, pulse train generally is beset by weather target velocity ambiguity.

The apparatus and method of the present invention are architected with the practical limitation in mind that a multitude of weather radar systems are presently installed and any improvements thereto should minimally impact the overall design of these weather radars and be reverse compatible therewith.

Compound Transmit Waveform

Therefore, existing systems are the obvious host for the apparatus of the present invention which modifies the presently installed apparatus by staggering at least one pulse of a series of n transmitted pulses to obtain additional data to resolve ambiguities that are inherent in the pulse Doppler weather radar system. The percent stagger of the transmitted pulses depends on the velocity unfolding ratio desired and typically a ratio of two thirds to three fourths is used. The frame rate created by the n transmitted pulses is fairly low and typically constitutes one tenth of the pulse repetition frequency. A low frame rate is desirable since it minimizes system susceptibility to transmitter stagger instabilities and affords minimum degradation in the regenerated uniformly spaced sequence.

Staggering one pulse out of every n transmitted pulses creates an isolated pulse doublet pair which is used to produce up to two additional sets of data that can be cooperatively used to eliminate ambiguities in the measured parameters. In particular, FIG. 4 illustrates one embodiment of this invention wherein the train of output pulses produced by synchronizer 407 are divided into a series of sequential frames k, k+1, each of which contains n pulses. Synchronizer 407 shifts in time at least one pulse in each frame of n generated output pulses to produce the isolated pulse doublet pair. The output pulse train of FIG. 4 produced by synchronizer 407 illustrates shifting the single pulse in each frame in a predetermined pulse position, although it is obvious that the pulse position of the pulse to be shifted can be varied in each or some of the frames in the train of pulses produced by synchronizer 407. In FIG. 4, $T_0$ is the uniform underlying pulse interval while the pulse doublet intervals $T_1+T_2=2T_0$. $T_1$ is the smaller duration interval and is typically $2T_0/3$ while $T_2$ is the longer duration interval and is typically $4T_0/3$.

In addition, FIG. 5 illustrates another possible pulse doublet pair generation arrangement. This pulse doublet pair is created over three uniform pulse intervals in this example $3T_0=T_1+T_2$. Pulse interval $T_1=6T_0/5$ while $T_2=9T_0/5$ for example. This waveform can be created from two frames as in FIG. 4 by reversing the second frame time axis and staggering a different amount in each of these now contiguous frames. Two pulses then have to be regenerated to produce the constant pulse repetition frequency.

It is obvious that there are numerous possible methods of creating the infrequently occurring pulse doublet pairs, with wide to narrow pulse spacing selections, with or without inter- or intra-pulse modulations. The key idea is to transmit the pulse doublet pairs within a train of uniformly-spaced pulses as infrequently as possible, consistent with the need to obtain additional data. Therefore a class of relatively sparse doublet pairs with spacing variations is defined for improved data quality applications.

Programmable Waveform Pattern Generator

Figure 8:
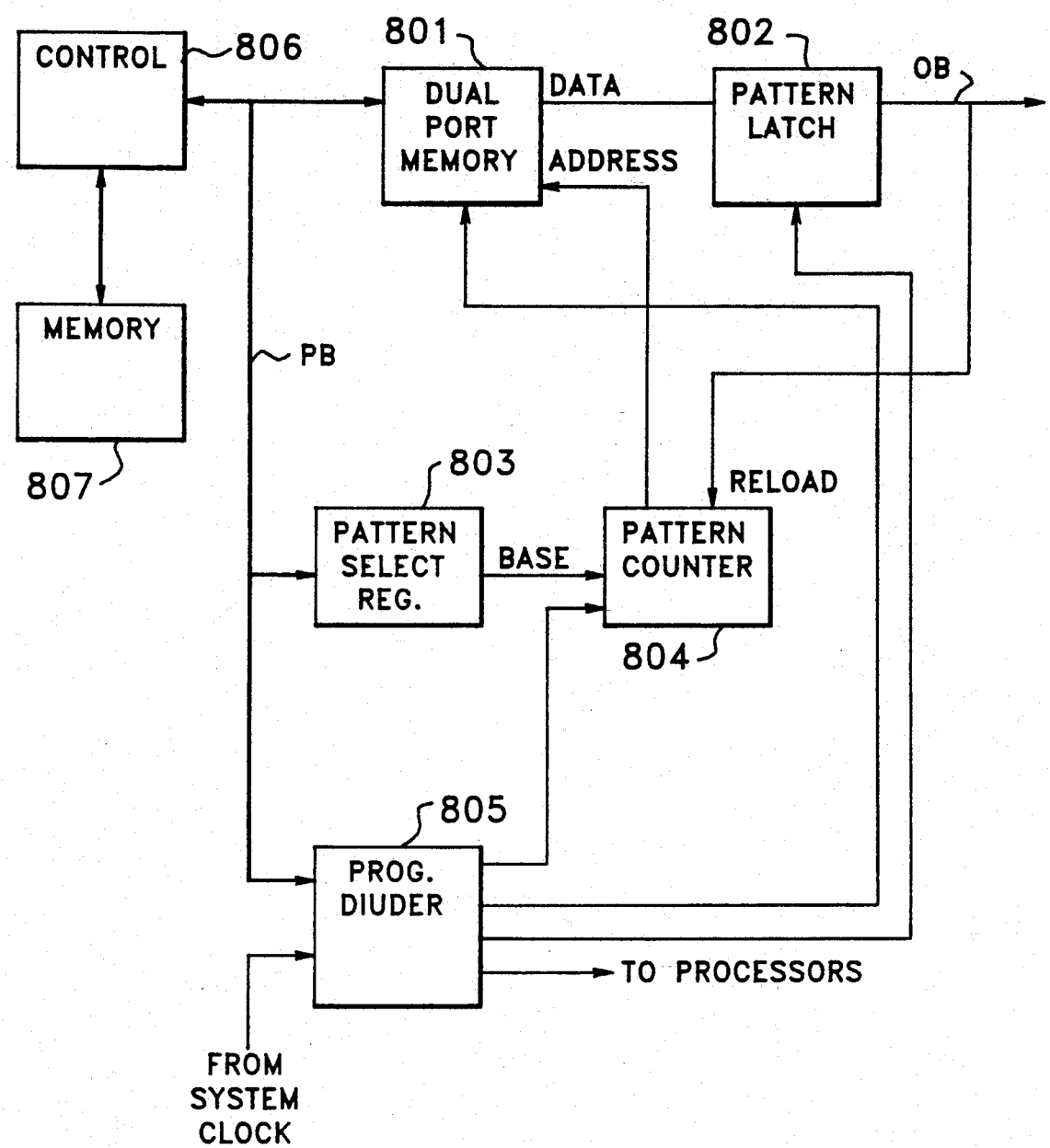
FIG. 8 illustrates a typical programmable waveform generator and selective enablement circuit.

FIG. 8 illustrates an implementation of a programmable waveform pattern generator 800 that is part of radar synchronizer 407. A control 806 is connected via bus PB to dual port memory 801, pattern select register 803 and programmable divider 805 to transmit data therebetween. In operation, controller 806 transmits data to programmable divider 805 to define the plurality of clock frequencies used in programmable waveform pattern generator 800. Controller 806 also writes data into pattern select register 803 and dual port memory 801 to select the pulse shift waveform and auxiliary control signals to be used. A master clock signal from exciter 408 is input to programmable divider 805 which outputs a plurality of output clock waveforms in response thereto. Pursuant to the program instructions received from controller 806, programmable divider 805 and pattern latch 807 outputs clock signals to parallel distributed processor 420 and all its component processors (416–418). Programmable divider 805 also outputs a clock pulse (pattern clock) to pattern counter 804 to advance the address data to dual port memory 801 to enable the output therefrom of the successive output pulses, including the pulse doublet pairs, and thereby synthesize a stable final waveform and auxiliary intra- and inter-pulse control signals. Once the repetitive sequence of frames is completed, pattern counter 804 is reset to initiate a new frame of output pulses. Pattern latch 802 buffers the output pulses received dual port memory 801 for transmission on to output bus OB to transmitter 104, receiver 105, etc.

Selective Enablement

It is obvious that the use of the isolated pulse doublet pair significantly reduces the processing load on the system in order to resolve ambiguities contained therein. It is also a capability of this system that the generation of the isolated pulse doublet pairs is selectively enabled in a manner that further reduces the processing load on the radar system. In particular, if there are no meteorological phenomena present in the scan area of the radar system, the use of the isolated pulse doublet pairs is redundant since there are no ambiguities to resolve. Therefore, controller 806 is designed to selectively enable the pulse doublet feature when encountering return echo signals which can be the cause of ambiguity. In addition, there may be regions of coverage of the radar system that are less critical in terms of required accuracy of output information and do not require extra processing power provided by the use of the isolated pulse doublet pairs. Therefore, the pulse doublet pair capability can be selectively enabled as a function of azimuth and elevation, time of day, presence of detected meteorological phenomena or other user specified parameters as stored in memory 807. The selective enablement of this feature allows the radar site operator to customize the operation of the weather radar for the particular needs of this locale in a manner to efficiently utilize the capability of this radar which is directly retrofittable into existing equipment to provide improved data outputs. The radar synchronizer 407 is the element in this architecture that would provide the selective enablement capability by passing the requisite control and timing signals to the exciter 08 and the parallel distributed processor 420 to activate the pulse doublet capability. The selective enablement can modify the radar system modulation waveform, its scanning pattern and processing to match the meteorological events (spatial distribution, intensity, geometry) to be detected. In addition, these characteristics can be modified to match the wavelength of the radar signal, echo signal levels, transmitter constraints (duty ratio, peak power, pulse repetition frequency limits) as well as the application of inter- and intra-pulse modulation. Included in the concept of selective enablement is the ability to regulate the number of shifted pulses per frame, the number of frames having shifted pulses, etc., to thereby vary the degree of pulse shifting used by the radar system.

Return Signal Characteristics

In Order to maximize the integrity of the data produced by this pulse train, and minimally affect the apparatus used to obtain the range and velocity parameters from the return echo signals, a constant pulse repetition frequency pulse train return echo signal is synthesized to reconstruct an unmodified pulse train of return echo signals as would be found in a conventional pulsed Doppler weather radar system 100. The synthesis of the constant pulse repetition frequency pulse train of return echo signals is accomplished by data commutator 411 extracting the staggered pulse return echo signals from the received stream of return echo signals. Data commutator 412, high rate signal processor 413 and echo sample predictor 414 extrapolate the return echo signal for the staggered pulse sample interval based on a plurality of the previously received return echo signals to estimate the return echo signal that normally would be received in that interval absent the shifting of the single pulse to create the pulse doublet pair. Alternatively, this data value can be synthesized by interpolating several prior and several subsequently received return echo signals in a conventional manner, such as spline fitting or neuromorphic filtering the return echo signals to estimate the value of the return echo signal that normally would be received in this pulse position. The synthesized train of return echo signals is then processed in high rate signal processor 413 in a conventional manner to obtain the standard data outputs from a constant pulse repetition frequency radar return signal with the inherent ambiguities in range and velocity.

Resolution of these ambiguities is accomplished by the use of the return echo signals produced by the isolated pulse doublet pairs since these pulse doublet pairs produce two additional frequency components that are used to determine the desired parameters, independent of the computations used in the constant pulse repetition frequency receiver. The echo information in the longer doublet pulse interval and its succeeding interval yield a low rate extension of the unambiguous reflectivity range to that permitted by the clearing time of the longer pulse interval. This extends the detection range for weather targets and eases the identification in the ambiguity and contamination reduction processor 417 illustrated in FIG. 3. Thus, for reduction of velocity ambiguity, the staggered pulses from the pulse doublet pairs yield paired, relatively independent estimates of Doppler velocity. Once per frame there are three velocity estimates available with the mathematically regenerated constant pulse repetition frequency train providing the most accurate velocity estimate. The shorter pulse interval of the pulse doublet pair produces a shorter accurate range estimate but a greater velocity detection range while the longer duration pulse interval of the pulse doublet pair plus next interval produce a longer accurate range estimate but a smaller dynamic range of measured velocities.

The production of these two additional estimates is made at the frame rate and requires little additional signal processing to obtain a significant improvement in data quality and ambiguity reduction. To reduce the variance of the velocity estimates, coherent averaging in performed over a plurality of pulses, typically on the order of thirty to a hundred pulses. Coherent averaging is not as likely with the low rate pulse doublet pairs but it should be noted that there is a spatial and temporal correlation of bulk meteorological parameters that are monitored by this Doppler weather radar system 400. Therefore, if the Doppler weather radar system 400 averages the returned pulse doublets over range and azimuth dimensions in a manner that is analogous to non-coherent space and time averaging, the system provides a sufficient number of independent samples to reduce the variance of the pulse doublet pair return echo signal estimates to match the variance of the base constant pulse repetition frequency train estimates of parameters. The correlation scales of the meteorological phenomena are normally much larger than the radar resolution cells used in this Doppler weather radar system. Therefore, the two meteorologically averaged pulse doublet pair parameter estimates are used to unfold the higher quality primary estimates produced by the constant pulse repetition frame pulse train to provide significant redundancy in the isolated weather regions and folded areas of a data scan.

System Architecture—Improved Doppler Weather Radar

FIG. 3 illustrates the preferred embodiment of the implementation of this apparatus using many components of an existing weather radar processing system such as that illustrated in FIG. 1. The transmitter 104 launches the microwave pulses using the compound pulse train illustrated in FIG. 4 through the scanning directional antenna 101 toward the weather phenomena. A return echo signal is received during the interpulse listening time, demodulated in conventional fashion by receiver 105, sampled in range (time) and converted to a digital representation. The digital representations are output by the receiver 105 to the data commutator 411 which separates out the low and high rate signal components therein. The low rate signal component is transmitted to the low rate signal processor 415 which makes use of the two return echo signals from each pulse doublet pair to perform spatial averaging of these return echo signals to extract meteorological weather data from the clutter at a lower extraction rate than the high rate signal processor 413 to perform the weather estimate computations, perform the time/space meteorological averaging and to produce two auxiliary streams of meteorological estimates. The data commutator 411 transmits the high rate signals to a second data commutator 412 which combines the received $n-1$ pulses of each frame of constant pulse repetition frequency pulses with a synthesized pulse for the single pulse period wherein the time shifted pulse is used to create the pulse doublet. An echo sample regenerator 414 is used to create the missing pulse, typically by extrapolation techniques, which is combined by the data commutator 412 with the received train of pulses to produce a synthesized constant pulse repetition frequency sequence of samples. This sequence of samples is applied to the high rate signal processor 413 which typically performs the conventional digital clutter notch filtering and estimation of meteorological signal power (reflectivity factor), mean Doppler frequency (velocity), frequency spectrum (velocity) width, and noise power. The high rate signal processor 413 performs the conventional Doppler weather radar computations to produce an unqualified prime stream of meteorological estimates.

A high echo coherence is maintained within the regenerated uniformly spaced sequence, and a high temporal parameter correlation exists between the spaced pulse doublets and the reconstituted sequence. For discrete targets there may at times be a high signal coherence among doublets too, depending on radar wavelength and target type. (Discrete targets such as fixed ground bodies, ground vehicles, water waves, ships, aircraft, and birds are classes of "non-meteorological" targets.) The high coherence and correlation of the data streams produced by the compound waveform are important for optimum performance of the combinational processing of elements 416, 417, 418.

The proposed compound waveform does not preclude the application of polarimetric observations, random phase processing, or pulse compression, sometimes proposed for future weather radars. Likewise it cooperates with present processing algorithms and the auto-PRF schemes for adaptation of the base pulse repetition frequency to the weather spatial distribution.

For echo processing (whether it be performed by the receiver 105, signal processor 413, or data processor blocks 420) the process or flow is one of: First, signal measurement (e.g., I and Q samples); Second, parameter estimation (e.g., mean values, spectrum moments, etc.); Third, use of the estimated parameters in classifying target returns (e.g., into meteorological regions, vehicular, clutter, etc.) based on multidimensional classification boundaries; Fourth, reduction of pulse Doppler ambiguities based on multidimensional parameter continuity; and Fifth, formatting and transmitting the results to the users. There are aspects of quality control and monitored self-training at each step in the process. The data rate reduces while the processing algorithm complexity increases at each step.

Use of this simple extension to the waveform and signal processing capitalizes on volume-time correlations inherent in meteorology at an early stage of the processing. The apparatus provides additional degrees of freedom in matching the waveform to meteorological events in range and velocity. It is backward compatible (i.e., consistent) with existing radars and schemes, or it may be used independently. The basic uniformly spaced sequence is nearly undisturbed. Either time domain or frequency domain analysis can be performed on the regenerated sequence. Extension of the unambiguous velocity by small percentage stagger (the isolated doublets) allows extension of the unambiguous range too, from the long interval ($T_2$) clearing time.

In existing transmitters the amount of variation of doublet times T1 and T2 is limited because of modulator charge/discharge limits, duty ratio maxima, or peak power maxima. Thus, the alternate waveform example of FIG. 5 is an adaptation of this invention which results from merging one pulse per frame, causing a different spacing for each frame's doublet.

Neuromorohic Processor

The unqualified prime stream of meteorological estimates is combined with the two auxiliary streams of meteorological estimates in a neuromorphic processor, such as the parallel distributed processor 420. In particular, the parallel distributed processor 420 consists of a multi-parameter target recognition processor 416, a ambiguity reduction processor 417 and a training processor 418. The target recognition processor 416 identifies, classifies and separates the meteorological targets from others and collects meteorological targets into categories for further processing or elimination. The ambiguity reduction processor 417 detects/flags minor residual multiple trip echoes, decodes meteorological regions based on spatial continuity by relating the three velocity estimates received from the low rate signal processor 415 and the high rate signal processor 413 to select the correct velocity interval for the return signals. The ambiguity reduction processor 417 extends the unfolded velocity surface into the small, remaining high gradient regions and depends on the modeled spatial continuity inherent in meteorological events. The training processor 418 is used in conjunction with a series of "expert" models or a database 419 to provide ancillary input data to the target recognition processor 416 and the ambiguity reduction processor 417 to identify expected anomalies and cite specific topological parameters that can cause errors in the signal processing.

Some reasons to use neuromorphic processing systems such as a parallel distributed processor are: (1) the distributed nature of the information storage in a parallel distributed processor makes it resistant to noise (robustness with independent noise or with ambiguities in the classification boundaries), and allows the processor to generalize to produce correct outputs for inputs that it was not specifically trained for; (2) a parallel implementation allows product estimates to be computed rapidly; (3) self-training continuous adaptation aspects of the processor reduce the dependence on a multiplicity of site adaptable parameters; (4) the performance of these algorithms degrade 'gracefully'; (5) "expert" or a priori knowledge can be gathered and applied in natural form rather than a collection of abstract rules; (6) the regular structure of the processor suggests that understandability, maintainability, upgradability, etc. should benefit from its use. The parallel distributed processor 420 of FIG. 3 is a mechanization consistent with the phenomena that is being measured, since meteorological fields are highly variable in form and pattern yet often exhibit high degrees of spatial correlation since the meteorological phenomena result from nonlinear irreversible and somewhat chaotic atmospheric physical processes. Using the high rate and low rate estimator fields which measure reflectivity, velocity, spectrum width, etc. in a parallel distributed processor 420, capitalizes on the intrinsic meteorological correlations within and among the fields. The knowledge database 419 and the training processor 418 capitalize on the intrinsic meteorological correlations among these fields and knowledge of the site specific and installation specific phenomena that can be determined during a training phase of operation of the system. The use of neuromorphic system implementation provides a most efficient method of eliminating ambiguity since small isolated multi-trip weather echoes have characteristic spatial shapes when viewed in polar radar coordinates and may be detected and flagged by a combination of low rate power estimators and feature identification processes. By using a neuromorphic system, the apparatus of the present invention is automatically self training and the feature recognition processor does not require costly installation specific tuning to adapt to topological and seasonal variations relevant to the particular installation site. This improvement significantly reduces the number of site adaptable parameters that must be addressed by the radar operators.

Matched Data Processor for a Pulsed Doppler Radar System

The processor 420 (shown in FIG. 3) for extracting and unfolding weather targets from a base data stream compares multiple parameters from the base data stream to ignore non-weather targets and to properly unfold the velocity and range of weather targets using methods similar to those used by a trained meteorologist, but much faster and less easily overwhelmed by the large volume of data.

This processor 420 consists of multiple simple processors that are configured into three main sections: a target recognition processor 416, an ambiguity reduction processor 417, and a training processor 418. Each processor may be implemented as a neuromorphic processor, such as a parallel distributed processor. A parallel distributed processor can be implemented in hardware as a (possibly) large number of simple processing elements, where the actual information in the network is stored in the form of weights that affect the values propagated between the processing elements.

Figure 6:
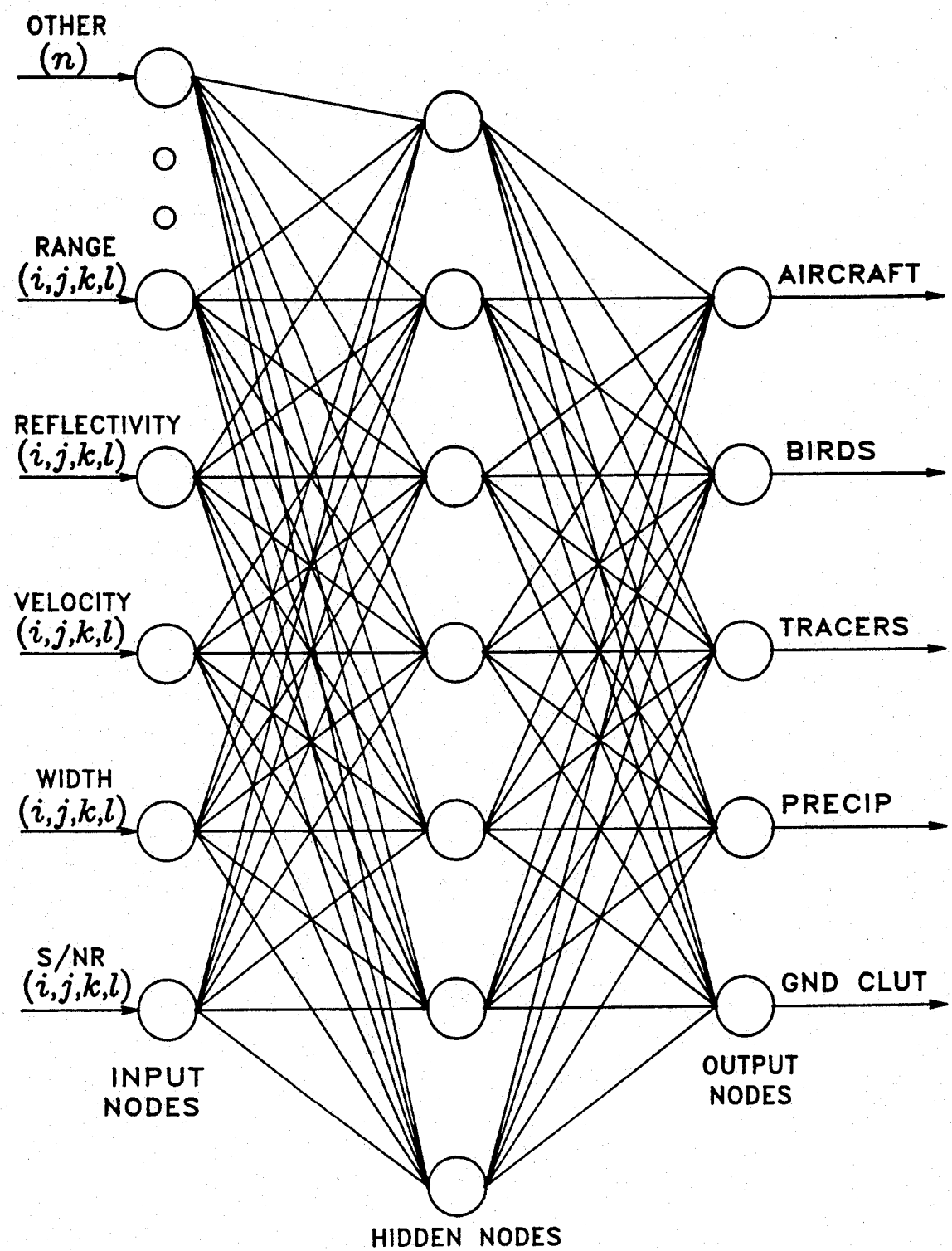
FIG. 6 illustrates in block diagram form an example target recognition processor.

An example of a segment of a parallel distributed processor is shown in FIG. 6, which illustrates a segment of a fully-connected feed-forward network with 5 input estimates per range cell times the number of range/azimuth samples viewed, a layer of hidden nodes, and an array of output nodes. The input signals propagate from the input through a weighting function (with a unique weight for each connection) to the hidden nodes, and then through another set of unique weights to the output nodes.

Parallel distributed processors can be implemented using custom parallel hardware such as the Intel 80170NX Electrically Trainable Analog Neural Network chips, the NeuraLogix NLX420, the Synaptics I-1000, or emulated in software on standard sequential computers such as personal computers and workstations. Almost all of the training can be done on sequential computers.

For example, the artificial neural system for doing point target recognition can be organized as a back-propagation network. Back-propagation networks are organized as two or more layers of processing elements. Hidden layers within the network allow the network to handle problems with inputs that are not linearly-separable (with the XOR function as the classic example). In a back-propagation network, the training sets are applied one vector at a time to the inputs of the network, and the inputs are multiplied by the connection weights and passed through some node output function (such as a sigmoid) before presentation to the next layer. After propagating through all the layers, the resulting output is compared with the desired output, and the errors are then propagated back to the inputs so the connection weights that contributed the most to the error are modified the most. Back-propagation networks are good at generalization. They learn to key off significant similarities in the input vectors, and ignore irrelevant differences.

Target Recognition Processor

The Target Recognition Processor 416 shown in FIG. 3 attempts to recognize non-weather artifacts such as clutter residue and point targets. Clutter residue is characterized by low velocities (less than 1 m/s) and higher reflectivity than clear air, and is typically seen at low elevation angles (less than 5 degrees). Point targets are typically very localized (less than three range cells per azimuth) high reflectivity returns with sharp discontinuity from the surrounding weather features. They can have any velocity within the Nyquist range and can be found at any elevation angle.

The target recognition processor 416 can look at five or more different product estimates per azimuth per range cell per data stream, with different product estimates for each range cell from the three data streams corresponding to the three different pulse repetition intervals generated from the compound waveform. The basic data stream group includes the signal-to-noise ratio SNR, the normalized target reflectivity Z, the target radial velocity V and echo spectrum width W, and the range as calculated from the header (FIG. 7).

The output for each range cell can be marked as clutter, point targets, insects, weather returns, background noise (no activity), or the range cell may be marked as unclassifiable. The target recognition processor 416 can be implemented as a parallel distributed processor organized as a competitive learning network. This marks the most likely output as being the correct output, and all other outputs are turned off.

The network illustrated in FIG. 6 displays a plurality of network inputs which each represent a vector variable. For these variables, the variable "i" is indicative of the data stream number for the high and low data rate streams, the variable "j" indicates the range cell number, the variable "k" indicates the azimuth number, and "l" indicates the elevation. Typical data stream inputs are the range of the detected target, the reflectivity, velocity, spectrum width, and signal to noise ratio data. The parallel distributed processor illustrated in FIG. 6 processes all these data values simultaneously for multiple range cells in multiple azimuths to identify the type of target detected for this particular volumetric cell in the radar scan. As noted in FIG. 6, typical targets can be aircraft, birds, ground clutter as well as meteorological phenomena such as wind tracers and precipitation. A parallel distributed processor can have its training refined during operation to adapt to local phenomena and site specific parameters, to more precisely identify the target type for a particular stream of input data. Therefore, if the antenna scan encounters topological features for a certain range in elevation and azimuth setting, the parallel distributed processor is able to reliably differentiate this topological feature from other signal returns. It is obvious that the set of training data used to initialize the parallel distributed processor can be obtained from other weather radar installations.

Multiple range cells can be examined simultaneously to improve the recognition of clutter fields. Point target identification requires examining multiple range cells simultaneously, but can use a combination of radial and azimuthal nearest-neighbor range cells. The reflectivity estimates for both the low-rate 415 and high-rate 413 signal processor are very similar for the same azimuth and elevation. The clutter residue may have different reflectivity estimates from the low-rate 415 and high-rate 413 signal processor due to differences in the notch filter technique used for the data streams in each signal processor.

FIG. 7 illustrates a particular set of data that is stored in the processors as a result of the antenna beam scan. For each elevation, the antenna beam scans the full 360° rotation using an antenna beam width that is typically 1°. The range cell samples that are created as a result of this scanning beam are typically spaced 100 meters to 1,000 meters apart and for the purpose of this example a value of 225 meters is selected. Therefore, the range cells in a radial direction from the directional antenna occur at 225 meter intervals and extend for the full range of the Doppler weather radar. As the radar beam scans the volume covered by the Doppler weather radar, the return data is compiled and formatted in the format illustrated in FIG. 7. A header is prepended to the plurality of data bytes and would typically include data indicative of the azimuth, elevation, time and the number of range cells per radial scan. The header can also include site specific information such as the transmitter power, the data filtering algorithm in use and any other relevant information. Each range cell contains the raw range sampled return echo signal that has been processed into spectral moment estimates as produced by the high rate and low rate processors. The data stored in each range cell is representative of the range, velocity, reflectivity and signal to noise ratio of the return echo signal. This data represents the information that is fed to the target recognition processor as described below.

Ambiguity Reduction Processor

The Ambiguity Reduction Processor 417 shown in FIG. 3 handles both range and velocity unfolding. Unfolding requires less information per range cell than target recognition, but requires more spatial information from both nearby range cells and from the possible multiple trip echoes (for range unfolding).

During the velocity estimation process, the low-rate 415 and high-rate 413 signal processors can produce different estimates for the velocity field due to the differing sample rates. In addition, the high-rate processors 413 make a velocity estimate by averaging many more data points than the low-rate processor 415, and so benefits from a less noisy result but with reduced range relative to the velocity estimate from the low-rate processor 415. Conversely, the low-rate processor 415 produces velocity estimates that are more noisy per range cell, but spatial continuity allows the velocity estimates from multiple range cells of the low-rate signal 415 processor to be examined simultaneously, effectively averaging away much of the noise without losing too much of the benefit of the higher effective Nyquist frequency. The complication of averaging the velocity estimates from the low-rate signal processor 415 is that shear boundaries can be incorrectly estimated in regions with high shear. This does not affect the accuracy of the velocity estimate from the high-rate signal processor 413, however. The high-rate signal processor's velocity estimate is used as the basis for the parallel distributed processor 420 velocity estimate for a range cell, with the averaged velocity estimates for nearby range cells from the low-rate signal processor 415 used to determine where to unfold the high-rate processor's velocity estimate.

Training Processor

The Training Processor 418 shown in FIG. 3 is responsible for adapting the target recognition 416 and ambiguity reduction 417 sub-systems to local conditions when the system is first installed, and then re-optimizing them while the system as a whole is operating. This allows the system to adapt to local conditions without requiring extensive manual intervention, and allows system performance to be improved without incurring excess down time.

The training processor 418 works by feeding a training data set to either the target recognition processor 416 or the unfolding processor 417. In the training and test data sets, the output that results from any particular input is known in advance. These data sets can be produced either by meteorologists or by algorithms that produce accurate results when run off-line but that are too slow to handle the required volume of data in real time during system operation. Expert models or other a priori knowledge such as a mean-field clutter residue map can be used to improve performance.

The difference between the desired output and the output produced by a parallel distributed processor with a particular set of weights can be viewed as an error surface that the training process attempts to flatten as much as possible. This is similar to least-squares approximation, but is substantially more complex due to the multi-dimensional non-linear input data. The error surface can be minimized with an iterative "steepest-descent" technique, which makes many small changes to the connection weights to minimize the sum of the squares of the errors for all of the output units.

The training processor 418 tracks the change in weights for all of the input and hidden nodes and can delete nodes whose weights do not change during training.

While a specific embodiment of this invention has been disclosed, it is expected that those skilled in the art can and will design alternate embodiments of this invention that fall within the scope of the appended claims.

We claim:

1. In a Doppler radar system that transmits a train of pulses of radio frequency energy and receives return echo signals from objects in response thereto, apparatus for reducing ambiguity in said return echo signals comprising:

means for generating a series of output pulse signals at a predetermined pulse repetition frequency;

means for transmitting a pulse of radio frequency energy in response to each of said series of output pulse signals; and means for controllably shifting in time j pulse signals of selected sequences of n output pulse signals where n is a positive integer greater than two and j is a positive integer greater than 0 and less than n/2, to create j pulse doublet pairs, a pulse of each said pulse doublet pair having a frequency that differs from said predetermined pulse repetition frequency o enable said Doppler radar system to produce estimates based upon more than one pulse repetition frequency from said return echo signals.

2. The apparatus of claim 1 wherein said controllably shifting means comprises:

means for shifting in time each of said pulse signals in a position in said sequence of n output pulse signals that is predetermined for each of said j pulse signals.

3. The apparatus of claim 1 wherein said controllably shifting means comprises:

means for shifting in time each of said j pulse signals in a position in said sequence of n output pulse signals that is variable for each of said j pulse signals.

4. The apparatus of claim 1 further comprising:

means for regulating the operation of said controllably shifting means as a function of at least one predetermined parameter.

5. The apparatus of claim 4, wherein said Doppler radar system includes an antenna that executes a scan pattern over a predetermined volume, said regulating means comprises:

means for storing data indicative of at least two segments of said predetermined volume; and means for generating a control signal to enable said controllably shifting means when said antenna scan pattern is presently executing in a first of said at least two segments of said predetermined volume.

6. The apparatus of claim 5 wherein said regulating means further comprises:

means for disabling said generating means when said antenna scan pattern is presently executing in a second of said at least two segments of said predetermined volume.

7. The apparatus of claim 4 wherein said regulating means comprises:

means for storing data indicative of return echo signals representative of return echo signals typically received from at least one predetermined object;

means for comparing said stored data with return echo signals presently received by said Doppler radar system; and means for generating a control signal to enable said controllably shifting means when said comparing means identifies a match between said stored data and said return echo signals presently received by said Doppler radar system.

8. The apparatus of claim 4 wherein said regulating means comprises:

means for storing data indicative of a predetermined time interval, having a start time and a stop time; and means for generating a control signal to enable said controllably shifting means as long as a present time matches said predetermined time interval.

9. The apparatus of claim 1 further comprising:

means for receiving said return echo signals;

means for computing a parameter of a detected object using said return echo signals, comprising:

means for computing a first parameter estimate for said detected object using said received return echo signals produced in response to said ones of said sequence of n output pulse signals generated at said predetermined pulse repetition frequency, and means for computing additional parameter estimates for said detected object using said received return echo signals produced in response to at least one of said j shifted output pulse signals.

10. The apparatus of claim 9 wherein said additional parameter estimate computing means comprises:

means for computing a second parameter estimate for said detected object using a received return echo signal produced in response to a first pulse of said pulse doublet pair for a one of said j shifted output pulse signals.

11. The apparatus of claim 10 wherein said parameter computing means further comprises:

means, responsive to said first and said second parameter estimates, for determining a parameter of said detected object.

12. The apparatus of claim 10 wherein said additional parameter estimate computing means further comprises:

means for computing a third parameter estimate for said detected object using a received return echo signal produced in response to a second pulse of said pulse doublet pair for said one of said at least one shifted output pulse signal.

13. The apparatus of claim 12 wherein said parameter computing means further comprises:

means, responsive to said first, said second and said third parameter estimates, for determining a parameter of said detected object.

14. The apparatus of claim 12 wherein said parameter computing means further comprises:

means, responsive to said first and said third parameter estimates, for determining a parameter of said detected object.

15. The apparatus of claim 9 wherein said first parameter estimate computing means comprises:

means, responsive to a receipt of said return echo signals resulting from a said sequence of n output pulse signals including said j shifted output pulse signals, for extrapolating a return echo sinal that would have been received from each of said j shifted output pulse signals had it not been shifted to thereby create a series of n return echo signals from a sequence of n unshifted output pulse signals.

16. The apparatus of claim 9 wherein said additional parameter estimate computing means comprises:

means for averaging said received return echo signals produced in response to at least one of said j shifted output pulse signals in m successively occurring sequences of output pulse signals to produce said additional parameter estimate.

17. The apparatus of claim 9 wherein said additional parameter estimate computing means comprises:

means for averaging said received return echo signals produced in response to at least one of said j shifted output pulse signals over a plurality of sequences of output pulse signals, which sequences vary in range and azimuth dimensions, to produce said additional parameter estimate.

18. The apparatus of claim 9 wherein said parameter computing means further comprises:
means, responsive to said first parameter estimate and said additional parameter estimates, for identifying the nature of an object from which said return echo signals are received.

19. The apparatus of claim 18 wherein said object nature identifying means comprises a parallel distributed processor that identifies a valid object in response to said first and said additional parameter estimates for each of said return echo signals.

20. The apparatus of claim 18 wherein said parameter computing means further comprises:
means, responsive to said object nature identifying means and to said first parameter estimate and said additional parameter estimates, for calculating said parameter of said detected object.

21. The apparatus of claim 20 wherein said calculating means comprises a parallel distributed processor that computes said parameter in response to said first and said additional parameter estimates for each of said return echo signals.

22. In a Doppler radar system that transmits a train of pulses of radio frequency energy and receives return echo signals from objects in response thereto, a method for reducing ambiguity in said return echo signals comprising the steps of:
generating a series of output pulse signals at a predetermined pulse repetition frequency;
transmitting a pulse of radio frequency energy in response to each of said series of output pulse signals; and
controllably shifting in time j pulse signals of selected sequences of n output pulse signals, where n is a positive integer greater than two and j is a positive integer greater than 0 and less than n/2, to create j pulse doublet pairs, a pulse of each said pulse doublet pair having a frequency that differs from said predetermined pulse repetition frequency to enable said Doppler radar system to produce estimates based upon more than one pulse repetition frequency from said return echo signals.

23. The method of claim 22 wherein said step of controllably shifting comprises:
shifting in time each of said j pulse signals in a position in said sequence of n output pulse signals that is predetermined for each of said j pulse signals.

24. The method of claim 22 wherein said step of controllably shifting comprises:
shifting in time each of said j pulse signals in a position in said sequence of n output pulse signals that is variable for each of said j pulse signals.

25. The method of claim 22 further comprising the step of:
regulating the operation of said step of controllably shifting as a function of at least one predetermined parameter.

26. The method of claim 25 wherein said Doppler radar system includes an antenna that executes a scan pattern over a predetermined volume, said step of regulating comprises:
storing data indicative of at least two segments of said predetermined volume; and
generating a control signal to enable said controllably shifting means when said antenna scan pattern is presently executing in a first of said at least two segments of said predetermined volume.

27. The method of claim 26 wherein said step of regulating further comprises:
disabling said generating means when said antenna scan pattern is presently executing in a second of said at least two segments of said predetermined volume.

28. The method of claim 25 wherein said step of regulating comprises:
storing data indicative of return echo signals representative of return echo signals typically received from at least one predetermined object;
comparing said stored data with return echo signals presently received by said Doppler radar system; and
activating said step of controllably shifting when said comparing means identifies a match between said stored data and said return echo signals presently received by said Doppler radar system.

29. The method of claim 25 wherein said step of regulating comprises:
storing data indicative of a predetermined time interval, having a start time and a stop time; and
activating said step of controllably shifting as long as a present time matches said predetermined time interval.

30. The method of claim 22 further comprising the steps of:
receiving said return echo signals;
computing a parameter of a detected object using said return echo signals, comprising:
computing a first parameter estimate for said detected object using said received return echo signals produced in response to said ones of said sequence of n output pulse signals generated at said predetermined pulse repetition frequency, and
computing additional parameter estimates for said detected object using said received return echo signals produced in response to at least one of said j shifted output pulse signals.

31. The method of claim 30 wherein said step of additional parameter estimate computing comprises:
computing a second parameter estimate for said detected object using a received return echo signals produced in response to a first pulse of said pulse doublet pair for a one of said j shifted output pulse signals.

32. The method of claim 31 wherein said step of parameter computing further comprises:
determining, in response to said first and said second parameter estimates, a parameter of said detected object.

33. The method of claim 31 wherein said step of additional parameter estimate computing further comprises:
computing a third parameter estimate for said detected object using a received return echo signal produced in response to a second pulse of said pulse doublet pair for said one of said j shifted output pulse signals.

34. The method of claim 33 wherein said step of parameter computing further comprises:
determining, in response to said first, said second and said third parameter estimates, a parameter of said detected object.

35. The method of claim 33 wherein said step of parameter computing further comprises:

determining, in response to said first and said third parameter estimates, a parameter of said detected object.

36. The method of claim 22 wherein said step of first parameter estimate computing comprises:
    extrapolating, in response to a receipt of said return echo signals resulting from a said sequence of n output pulse signals including said j shifted output pulse signals, a return echo sinal that would have been received from said j shifted output pulse signals had it not been shifted to thereby create a series of n return echo signals from a sequence of n unshifted output pulse signals.

37. The method of claim 30 wherein said step of additional parameter estimate computing comprises:
    averaging said received return echo signals produced in response to at least one of said j shifted output pulse signals in m successively occurring sequences of output pulse signals to produce said additional parameter estimate.

38. The method of claim 30 wherein said step of additional parameter estimate computing comprises:
    averaging said received return echo signals produced in response to at least one of said j shifted output pulse signals over a plurality of sequences of output pulse signals, which sequences vary in range and azimuth dimensions, to produce said additional parameter estimate.

39. The method of claim 38 wherein said step of parameter computing further comprises:
    identifying, in response to said first parameter estimate and said additional parameter estimates, the nature of an object from which said return echo signals are received.

40. The method of claim 30 wherein said step of parameter computing further comprises:
    calculating, in response to said object nature identifying means and to said first parameter estimate and said additional parameter estimates, said parameter of said detected object.

* * * * *